United States Patent [19]
Hattori

[11] Patent Number: 6,152,610
[45] Date of Patent: Nov. 28, 2000

[54] OPTICAL TRANSMISSION MECHANISM FOR MOUNT CHIP AND CHIP MOUNTING

[75] Inventor: Yoshikazu Hattori, Kawasaki, Japan

[73] Assignee: Fujitsu Limited, Kawasaki, Japan

[21] Appl. No.: 09/129,363

[22] Filed: Aug. 5, 1998

[30]  Foreign Application Priority Data

Apr. 16, 1998 [JP] Japan .................................. 10-106368

[51] Int. Cl.$^7$ .................................................. G02B 6/36
[52] U.S. Cl. ................... 385/88; 385/14; 385/49
[58] Field of Search ................ 385/14, 49, 53, 385/88–94

[56] References Cited

U.S. PATENT DOCUMENTS

| | | | |
|---|---|---|---|
| 4,070,516 | 1/1978 | Kaiser ........................ | 428/137 |
| 4,268,113 | 5/1981 | Noel, Jr. ..................... | 385/92 |
| 4,826,272 | 5/1989 | Pimpinella et al. ......... | 385/92 |
| 4,969,712 | 11/1990 | Westwood et al. ......... | 385/14 |
| 4,976,506 | 12/1990 | Pavlath ....................... | 385/14 |
| 5,093,879 | 3/1992 | Bregman et al. ........... | 385/93 |
| 5,125,054 | 6/1992 | Ackley et al. .............. | 385/49 |
| 5,200,631 | 4/1993 | Austin et al. ............... | 257/81 |
| 5,345,529 | 9/1994 | Sizer, II et al. ............ | 385/147 |
| 5,351,331 | 9/1994 | Chun et al. ................. | 385/97 |
| 5,790,730 | 8/1998 | Kravitz et al. .............. | 385/49 |
| 5,956,150 | 9/1999 | Kanne ......................... | 356/399 |

OTHER PUBLICATIONS

English Abstract of Japanese Patent Appln. Laid–Open No. 4–284406 dated Oct. 9, 1992.

*Primary Examiner*—John D. Lee
*Assistant Examiner*—Juliana Kang
*Attorney, Agent, or Firm*—Armstrong, Westerman, Hattori, McLeland & Naughton

[57] ABSTRACT

An optical transmission mechanism including a first optical fiber protruding from a chip, and a second optical fiber protruding from a circuit board. The tip ends of the first and second optical fibers are coupled with each other. A guide member contacting the tip end of the second optical fiber may be used to position the tip end of the second optical fiber at a face-to-face coaxial position with the tip end of the first optical fiber. The tip ends of the first and second optical fibers are easily coupled with each other without positioning the chip relative to the circuit board.

10 Claims, 6 Drawing Sheets

OPTICAL TRANSMISSION MECHANISM FOR MOUNT CHIP AND CHIP MOUNTING

BACKGROUND OF THE INVENTION

1. Field of the Invention

The present invention relates to an optical transmission mechanism for connecting a chip to an optical transmission path defined in a substrate of a circuit board when the chip is mounted on the substrate. Also, the invention relates to a chip mounting method utilizing the mentioned optical transmission mechanism.

2. Description of the Related Art

Computer systems such as main frames have usually employed electric wires printed on a board so as to transmit signals between chips. However, the transmission velocity of electric signals has a limit, so that faster calculation or processing cannot be expected with electric wires anymore.

Optical transmission is proposed to transmit signals between chips. The implementation of optical transmission is supposed to realize a faster signal transmission so that calculation or processing can be accelerated.

In order to implement optical transmission between chips on a circuit board, light emitting and/or light detecting elements on the chips need be optically coupled to optical transmission paths such as optical fibers and optical waveguides in the substrate of the circuit board. For example, an optical fiber may be used to connect a light detecting element to an optical waveguide in a substrate of a circuit board and to likewise connect a light emitting element to an optical waveguide. One ends of the respective optical fibers are adhered to the chip at receiving bores leading to the light emitting and detecting elements, while the other ends of the optical fibers are adhered to the substrate at receiving bores leading to the optical waveguides.

When a chip is mounted on a substrate of a circuit board with the above-mentioned structure, optical fibers are first adhered to either of the chip or the substrate. The optical fibers then need be inserted into receiving bores on the other of the chip or the substrate. The chip must be positioned with higher accuracy with respect to the substrate so as to prevent failure in inserting the tips of the optical fibers in the receiving bores. Also, if the space between the receiving bores in the chip is smaller or larger than that of the substrate, positioning the chip with higher accuracy to insert the tip of one of the optical fibers in the corresponding receiving bore cannot help insert the tip of the other of the optical fibers to enter the corresponding receiving bore.

SUMMARY OF THE INVENTION

It is accordingly an object of the present invention to provide an optical transmission mechanism capable of implementing a reliable signal transmission between a chip and an optical transmission path in a substrate of a circuit board with less accuracy in positioning the chip to be mounted on the circuit board.

According to a first aspect of the present invention, there is provided an optical transmission mechanism comprising: a first optical fiber protruding from a chip; and a second optical fiber protruding from a substrate so as to be coupled to the first optical fiber when the chip is mounted on the substrate.

In optically connecting the chip and the substrate in a circuit board, the optical transmission mechanism serves to easily position the tip ends of the first and second optical fibers at a face-to-face coaxial position by utilizing deformation of at least either of the first and second optical fibers. Accordingly, a reliable optical signal transmission can be achieved between the chip and the substrate. The optical signal transmission may be used when optical signals are exchanged between the chips, when optical signals are supplied from an input terminal on the circuit board to the chip, and when optical signals are transmitted from the chip to an output terminal of the circuit board. The circuit board may comprise an optical transmission path formed in the substrate.

The optical transmission mechanism may further comprise a guide member contacting a tip end of the second optical fiber. Otherwise, the optical transmission mechanism may comprise a guide member contacting a tip end of the first optical fiber. The guide members serve to position the tip end of the second or first optical fiber at a face-to-face coaxial position with the tip end of the first or second optical fiber even after the chip is positioned relative to the substrate of the circuit board. Accordingly, the chip need not be positioned with high accuracy relative to the substrate of the circuit board. The guide members may be subjected to a displacement force when the chip is to be mounted on the substrate.

In addition to the guide member contacting the tip end of the second optical fiber, the optical transmission mechanism may include a subsidiary guide member contacting the tip end of the first optical fiber. The optical transmission mechanism with the guide member and subsidiary guide member serves to bring the tip end of the second or first optical fiber closer to the tip end of the first or second optical fiber at the same time. Accordingly, the tip ends of the first and second optical fibers with wider offset can be brought coaxial.

In this case, the tip ends of the first and second optical fibers can be brought coaxial with each other by aligning the subsidiary guide member with the guide member. The subsidiary guide member is positioned with respect to the guide member when the chip is mounted on the substrate by urging the guide member and subsidiary guide member against a common abutment wall. If the position of the first optical fiber with respect to a reference plane on the subsidiary guide member is precisely aligned with the position of the second optical fiber with respect to a reference plane on the guide member, the common abutment wall serves to align the first and second optical fibers with each other.

The aforementioned optical transmission mechanism may be applied to the circuit board comprising a substrate with an optical transmission path formed therein between chips to be mounted. The circuit board may further comprise an optical fiber protruding from the substrate so as to lead to the optical transmission path, and a guide member contacting a tip end of the optical fiber.

When the aforementioned optical transmission mechanism is applied to a circuit board, the chip is first positioned with respect to the substrate of a circuit board, and the tip end of the optical fiber protruding from at least one of the chip and substrate is displaced with respect to the other of the chip and substrate by moving the guide member contacting the tip end with respect to the one of the chip and substrate.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
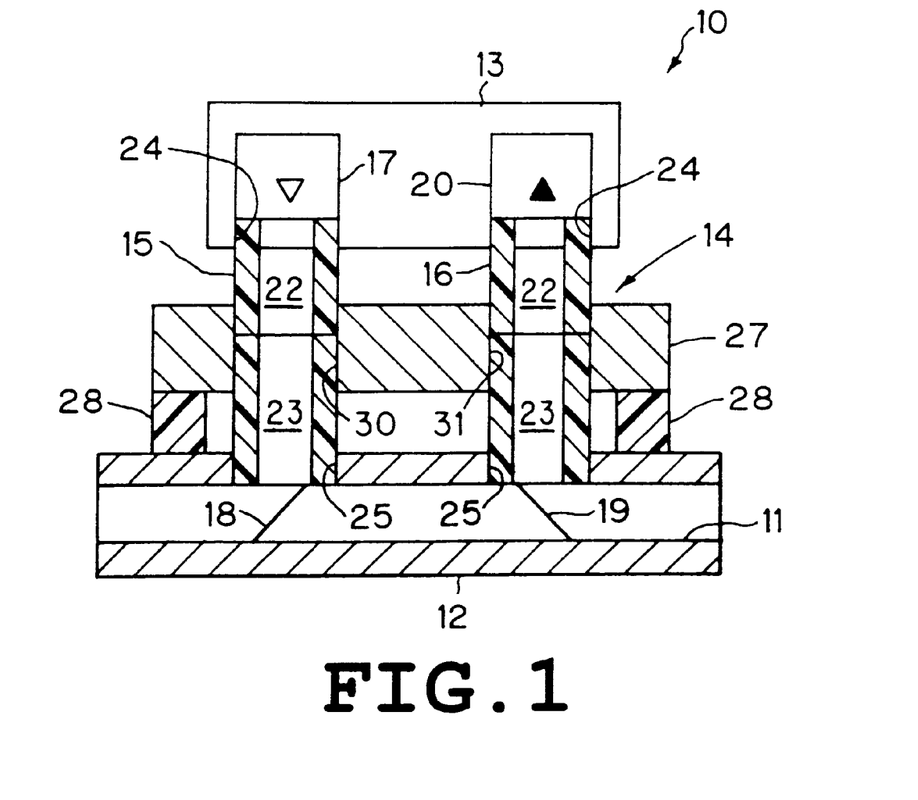
FIG. 1 is a sectional view of a circuit board employing an optical transmission mechanism according to a first embodiment of the present invention.

FIG. 1 illustrates a circuit board 10 to which an optical transmission mechanism according to a first embodiment of the present invention is applied. The circuit board 10 comprises a substrate 12 with an optical transmission path 11 formed therein, and one or more chip 13 mounted on the substrate 12. The optical transmission path 11 may be used when optical signals are exchanged between the chips 13, when optical signals are transmitted from an input terminal, not shown, on the circuit board 10 to the chip 13, and when optical signals are transmitted from the chip 13 to an output terminal, not shown, on the circuit board 10. The optical transmission path 11 may take a form of an optical fiber and/or an optical guidewave, for example.

An optical transmission mechanism 14 is provided between the chip 13 and the substrate 12. The optical transmission mechanism 14 includes a first optical passage 15 for directing optical signals from the chip 13 to the optical transmission path 11 in the substrate 12, and a second optical passage 16 for directing optical signals running through the optical transmission path 11 to the chip 13. When the chip 13 transmits optical signals, a semiconductor laser, not shown, in a light emitting section 17 emits light, which is in turn converged by a mirror, not shown, to run through the first optical passage 15. The light passing through the first optical passage 15 is then reflected by a mirror 18 to run through the optical transmission path 11. On the other hand, when the chip 13 receives optical signal, light running through the optical transmission path 11 is reflected by a mirror 19 into the second optical passage 16, which in turn is detected by a light detecting element, not shown, in a light receiving section 20.

The first and second optical passages 15, 16 respectively include a first optical fiber 22 protruding from the chip 13, and a second optical fiber 23 protruding from the substrate 12. The base ends of the first optical fibers 22 are fixed by adhesion in receiving bores 24 which are formed in the chip 13 to lead to the light emitting and receiving sections 17, 20, respectively. The base ends of the second optical fibers 23 are likewise fixed by adhesion in receiving bores 25 which are formed in the substrate 12 to lead to the mirrors 18, 19 in the optical transmission path 11.

The tip ends of the first optical fibers 22 are coaxially coupled to the tip ends of the corresponding second optical fibers 23, respectively, in a guide member 27. The guide member 27 is attached by elastic attachments 28 to the substrate 12.

Next, the description will be made on the production process of the circuit board 10. The substrate 12 of ceramics or the like is first prepared to include the optical transmission path 11 arranged in accordance with a pattern the chips 13 are to be mounted. The receiving bores 25 are formed on the substrate 12 at locations the chips 13 are mounted. The receiving bores 25 are formed corresponding to the first and second optical passages 15, 16.

Figure 2:
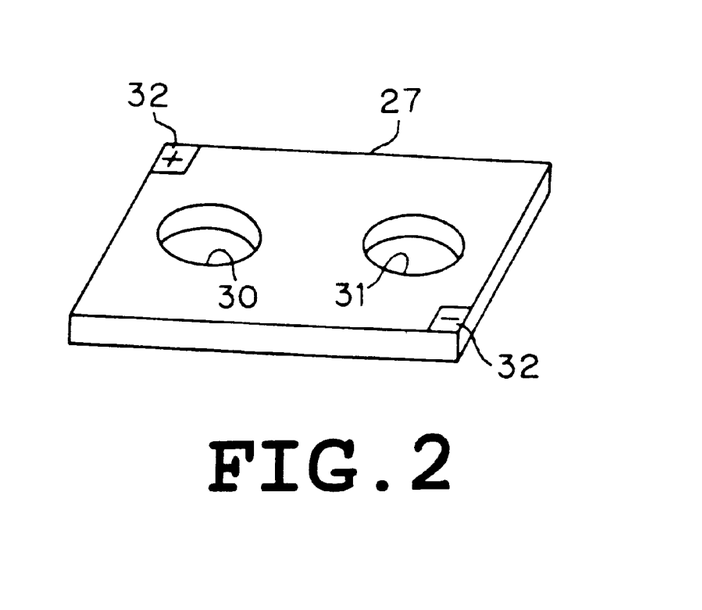
FIG. 2 is a perspective view of a guide member.

The guide member or plate 27 is then prepared from conductive material such as metal. The guide member 27 is provided with, as shown in FIG. 2, a guide bore 30 serving to guide the tip ends of the associated first and second optical fibers 22, 23 for forming the first optical passage 15, and a guide bore 31 serving to guide the tip ends of the associated first and second optical fibers 22, 23 for forming the second optical passage 16. Terminal pads 32 are attached to the guide member 27 at the periphery, namely, two opposite corners, to locate the guide bores 30, 31 therebetween. The terminal pads 32 are used to cause an electric current to cross the guide member 27.

Figure 3:
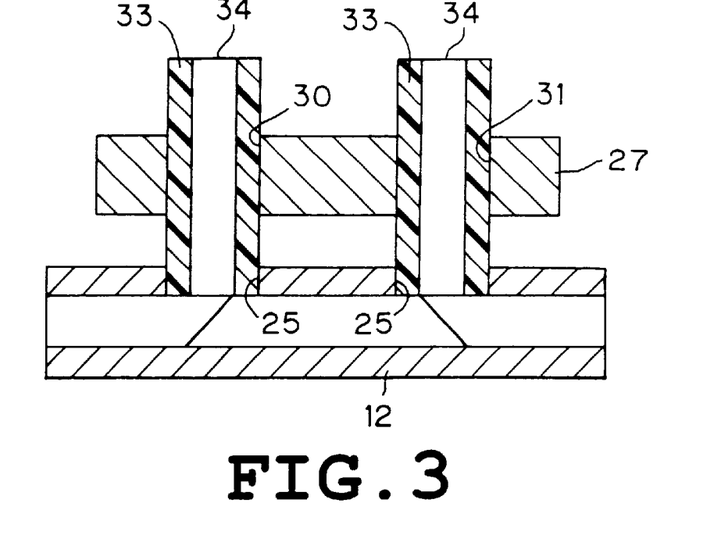
FIG. 3 is a sectional view illustrating the production process of the circuit board.

As shown in FIG. 3, along optical fiber 34 is then inserted into each of the guide bores 30, 31. The peripheral surface of the long optical fiber 34 is covered with a fusible layer 33. The tip ends of the long optical fibers 34 are inserted and adhered into the receiving bores 25 in the substrate 12. The guide member 27 is thereafter superposed on the substrate 12, and the long optical fibers 34 is cut off to leave a part of the fibers 34 filling the guide bores 30, 31.

The guide member 27 is then separated from the substrate 12. The elastic attachments 28 are formed by an adhesive or the like. In this way, the second optical fibers 23 are prepared to occupy half of the guide bores 30, 31 as shown in FIG. 4.

Assume that the chip 13 is to be mounted on the optical circuit substrate 12 on which the guide member 27 is fixed. As shown in FIG. 4, the first optical fibers 22 are previously attached by adhesion in the receiving bores 24 in the chip 13. The peripheral surface of the first optical fibers 22 are covered with a fusible layer 33.

Figure 4:
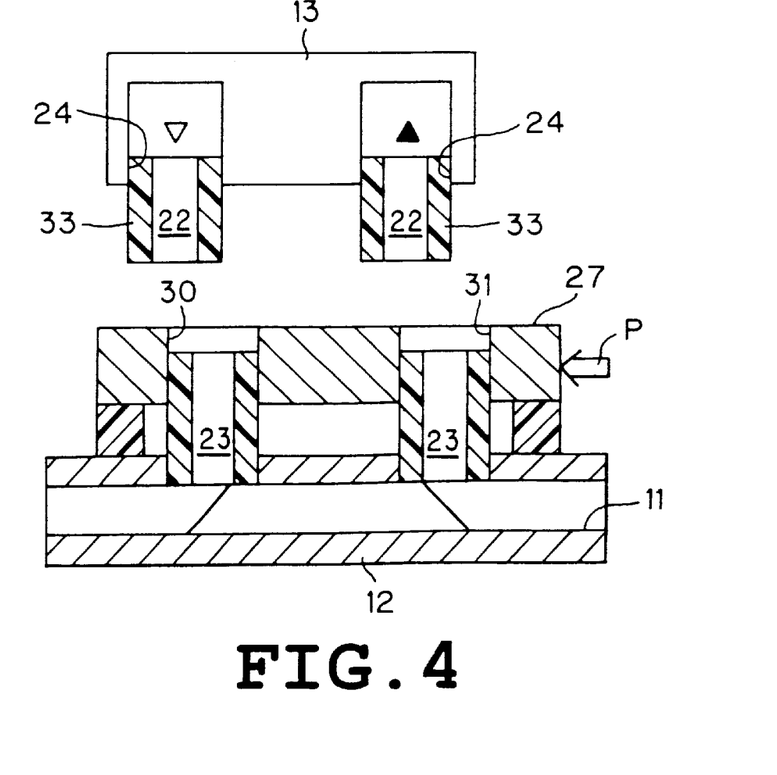
FIG. 4 is a sectional view illustrating the process of mounting a chip on a substrate.

As shown in FIG. 4, the chip 13 placed above the substrate 12 is lowered in the vertical direction toward the substrate 12. For example, assume that the tip ends of the first optical fibers 22 take offset positions with respect to the guide bores 30, 31. In this condition, the lowered chip 13 cannot insert the first optical fibers 22 into the guide bores 30, 31. Here, a displacement force P may be acted on the guide member 27 in a lateral direction in parallel with the surface of the substrate 12. The displacement force P causes the elastic attachments 28 and the second optical fibers 23 to deform, thereby forcibly displacing the position of the guide bores 30, 31. If the chip 13 is further lowered when the guide bores 30, 31 assume coaxial position with the tip ends of the first optical fibers 22, the tip ends of the first optical fibers 22 are smoothly inserted into the guide bores 30, 31. The tip ends of the first and second optical fibers 22, 23 consequently take face-to-face coaxial positions within the guide bores 30, 31, respectively.

Thereafter, electric current is introduced in the guide member 27 between the terminal pads 32 thereon. The electric current serves to heat the guide member 27 of metallic material, so that the fusible layers 33 around the first and second optical fibers 22, 23 melt. Here, the fusible layers 33 have a melting point lower than that of the glass. The glass usually has a melting point nearly reaching 1000 degrees centigrade. When the guide member 27 has cooled, the fusible layers 33 solidifies, so that the tip ends of the first and second optical fibers 22, 23 are fixedly coupled to each other. After the displacement force P has been released, the first and second optical fibers 22, 23 are kept fixed to provide a reliable transmission of optical signals between the first and second optical fibers 22, 23.

As described above, the displacement of the tips of the second optical fibers 23 by the displacement force P enables a reliable coupling of the tips of the first optical fibers 22 with the tips of the second optical fibers 23, without positioning the chip 13 with respect to the substrate 12 with higher accuracy. In particular, making the length of the first optical fibers 22 for the first and second optical passages 15, 16 different from each other allows the tips of the first optical fibers 22 to enter the guide bores 30, 31 in the guide member 27 even if the space between the receiving bores 24 on the chip 13 is different from that of the receiving bores 25 on the substrate 12. After the longer first optical fiber 22 is inserted in one of the guide bores 30, 31 with the guide member 27 being displaced by the displacement force P, the shorter first optical fiber 22 can be inserted into the remaining guide bore 30 or 31 with the guide member 27 being further displaced.

Figure 5:
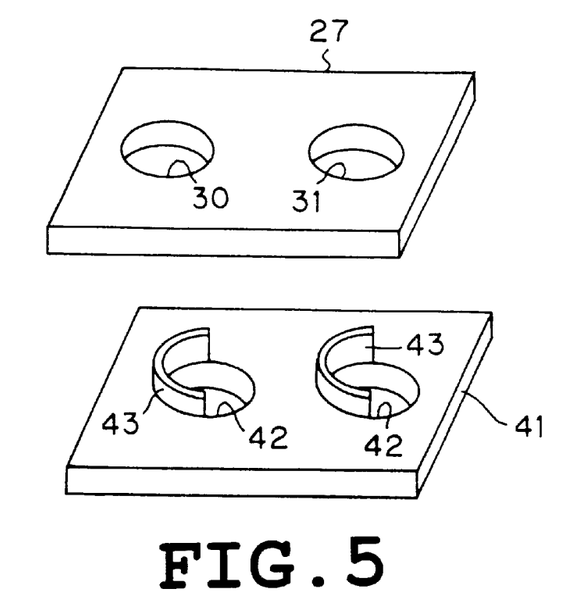
FIG. 5 is a perspective view illustrating a guide member and a coupling member constituting an optical transmission mechanism according to a second embodiment of the present invention.

FIG. 5 illustrates the guide member 27 and a coupling member 41 constituting an optical transmission mechanism according to a second embodiment of the present invention. In this embodiment, the coupling member 41 is adapted to fixedly couple the first and second optical fibers 22, 23 in place of the fusible layer 33 in the previous embodiment. The common reference numerals or characters are attached to the structure achieving the same function or effect as of the first embodiment.

When the circuit board 10 is produced, the substrate 12 is first prepared, as shown in FIG. 1, in the same manner as described above in the first embodiment. The guide member 27 and the coupling member 41 are then prepared as shown in FIG. 5. The guide member 27 and the coupling member 41 may be made of synthetic resin material, metallic material, or the like.

The coupling member 41 includes through holes 42 corresponding to the guide bores 30, 31 in the guide member 27. Vertical walls 43 are formed around the entrance of the through holes 42 to define urging surfaces continuous from the inner surfaces of the through holes 42. When the coupling member 41 is superposed on the guide member 27, the vertical walls 42 enter the guide bores 30, 31. The sufficient space is defined between the urging surfaces inside the vertical walls 42 and the opposed inner surfaces of the guide bores 30, 31 for receiving the first and second optical fibers 22, 23.

Long optical fibers are inserted into the guide bores 30, 31 in the guide member 27 in the manner shown in FIG. 3, and penetrate through the through holes 42 in the coupling member 41 to reach the receiving bores 25 in the substrate 12. The tip ends of the long optical fibers are fixed by adhesion in the receiving bores 25. The long optical fibers are subsequently cut as described above, and the elastic attachments 28 are formed. The elastic attachments 28 serve to couple the coupling member 41 with the substrate 12. The guide member 27 is provisionally fixed on the coupling member 41. In this way, the second optical fibers 23 are prepared to occupy half of the guide bores 30, 31 respectively accommodating the vertical walls 42 as shown in FIG. 6.

When the chip 13 is to be mounted on the circuit board substrate 12 on which the coupling member 41 with the guide member 27 is fixed, the chip 13 is positioned and lowered toward the substrate 12. The displacement force P is acted on the guide member 27 and the coupling member 41 so as to reliably insert the tips of the first optical fibers 22 into the guide bores 30, 31.

Figure 6:
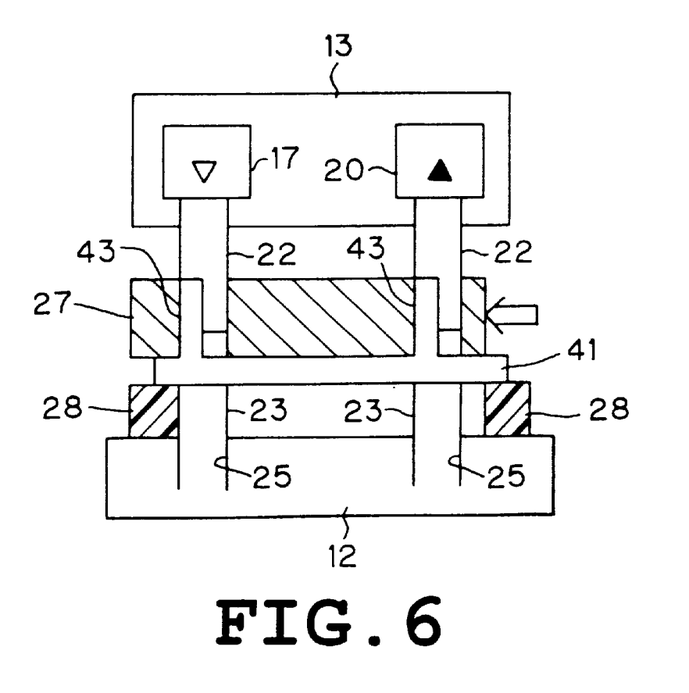
FIG. 6 is a sectional view of a circuit board employing the optical transmission mechanism according to the second embodiment.

As shown in FIG. 6, after the insertion of the tips of the first optical fibers 22 into the guide bores 30, 31 is confirmed, the guide member 27 is displaced with respect to the fixed coupling member 41. The relative displacement of the guide member 27 allows the urging surfaces of the vertical walls 43 to approach the opposed inner surfaces of the guide bores 30, 31. As a result, the first and second optical fibers 22, 23 are urged by the urging surfaces against the inner surfaces of the guide bores 30, 31. The guide member 27 is then adhered to the coupling member 41. The first and second optical fibers 22, 23 are fixedly coupled with each other between the urging surfaces of the vertical walls 43 and the opposed inner surfaces of the guide bores 30, 31 by urging force.

The coupling member 41, not attached with the guide member 27, may be attached to the substrate 12 in this second embodiment. In this case, the tip ends of the first optical fibers 22 on the chip 13 are first inserted through the corresponding guide bores 30, 31 in the guide member 27. The displacement force P acting on the guide member 27 serves to displace the tip ends of the first optical fibers 22 relative to the chip 13, so that the tip ends of the first optical fibers 22 are positioned at coaxial positions to the tip ends of the second optical fibers 23.

Figure 7:
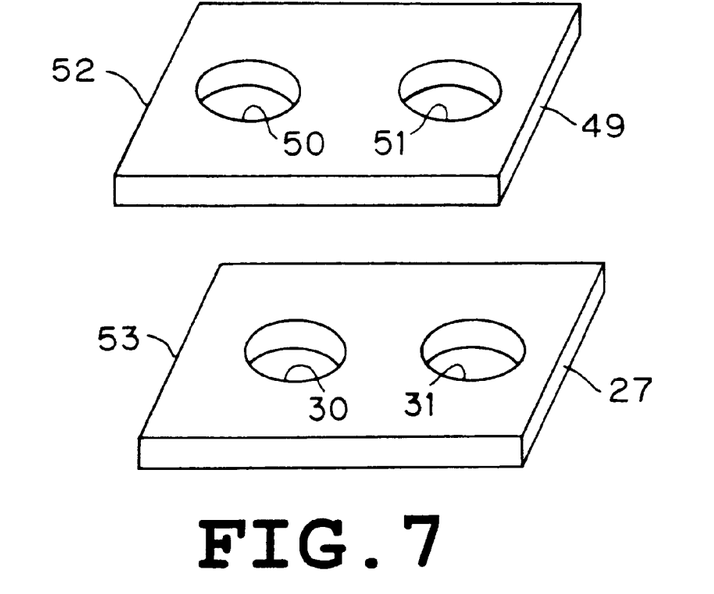
FIG. 7 is a perspective view illustrating a guide member and a subsidiary guide member constituting an optical transmission mechanism according to a third embodiment of the present invention.

FIG. 7 illustrates the guide member 27 and a subsidiary guide member 49 constituting an optical transmission mechanism according to a third embodiment of the present invention. In this third embodiment, the guide member 27 serves to displace the tip ends of the second optical fibers 23 in the same manner as described in the previous embodiments, and at the same time, the tip ends of the first optical fibers 22 are displaced by the subsidiary guide member 49. Accordingly, it is possible to position the tip ends of the first and second optical fibers 22, 23 at face-to-face coaxial positions by aligning the guide member 27 and the subsidiary guide member 49. The common reference numerals or characters are attached to the structure achieving the same function or effect as of the previous embodiments.

When the circuit board 10 is to be produced, the substrate 12 is prepared, as shown in FIG. 1, in the same manner as described above in the previous embodiments. The guide member 27 and the subsidiary guide member 49 are then prepared as shown in FIG. 7. The subsidiary guide member 49 comprises subsidiary guide bores 50, 51 formed therein corresponding to the guide bores 30, 31, respectively. The positional relationship between the subsidiary guide bores 50, 51 and a reference plane 52 completely coincides with that between the guide bores 30, 31 and a reference plane 53.

Figure 8:
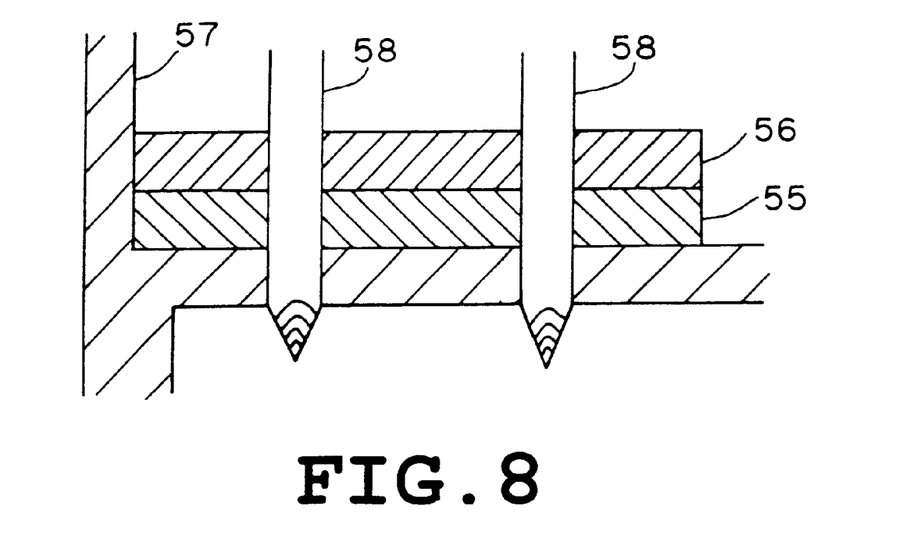
FIG. 8 illustrates the process of producing the guide member and the subsidiary guide member.

In producing the aforementioned guide member 27 and subsidiary guide member 49, superposed plates 55, 56 are prepared as shown in FIG. 8. The plates 55, 56 may be made of synthetic resin material, metallic material, or the like. A side surface of the superposed plates 55, 56 are abutted against a certain abutment wall 57. The plates 55, 56 are then subjected to processing by parallel drills 58, for example, so that the guide bores 30, 31 and the subsidiary guide bores 50, 51 are formed at positions aligned to the reference planes 53, 52 in the plates 55, 56.

Figure 9:
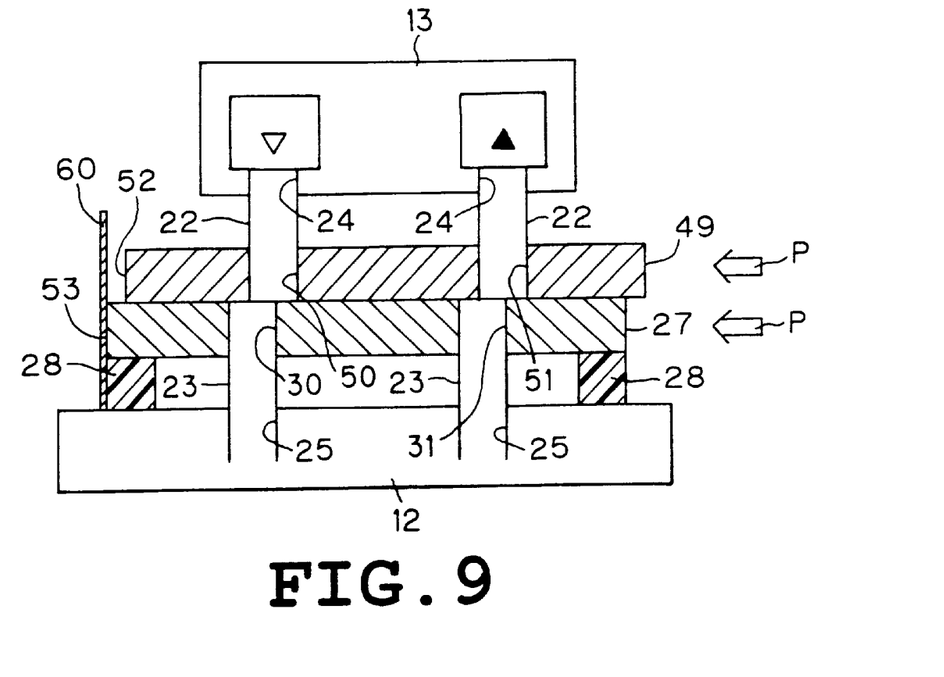
FIG. 9 is a sectional view illustrating the process of mounting the chip on substrate of the circuit board.

Long optical fibers are inserted into the guide bores 30, 31 in the guide member 27 in the manner shown in FIG. 3. The tip ends of the long optical fibers are inserted and fixed by adhesion in the corresponding receiving bores 25. Different from the first embodiment, the guide member 27 may be fixed by the elastic attachments 28 on the substrate 12. After fixation, the long optical fibers are cut off to leave parts filling the guide bores 30, 31. The optical fibers remaining in the guide bores 30, 31 are fixed in the guide bores 30, 31. The fixation may be achieved by a fusible layer or an adhesive. In this way, the second optical fibers 23 are prepared to occupy the entire guide bores 30, 31 as shown in FIG. 9. The tip ends of the second optical fibers 23 face outside at the surface of the guide member 27.

Long optical fibers are likewise inserted into the subsidiary guide bores 50, 51 in the subsidiary guide member 49. The tip ends of the long optical fibers are inserted and fixed by adhesion in the corresponding receiving bores 24 in the chip 13. The subsidiary guide member 49 is provisionally attached to the chip 13 at a location apart from the chip 13 by a predetermined amount. The long optical fibers are fixed to the subsidiary guide member 49. The fixation may be achieved by a fusible layer or an adhesive. After fixation, the long optical fibers are cutoff to leave parts filling the subsidiary guide bores 50, 51. In this way, the first optical fibers 22 is prepared to occupy the entire subsidiary guide bores 50, 51 as shown in FIG. 9. The tip ends of the first optical fibers 23 face outside at the surface of the subsidiary guide member 49.

Figure 10:
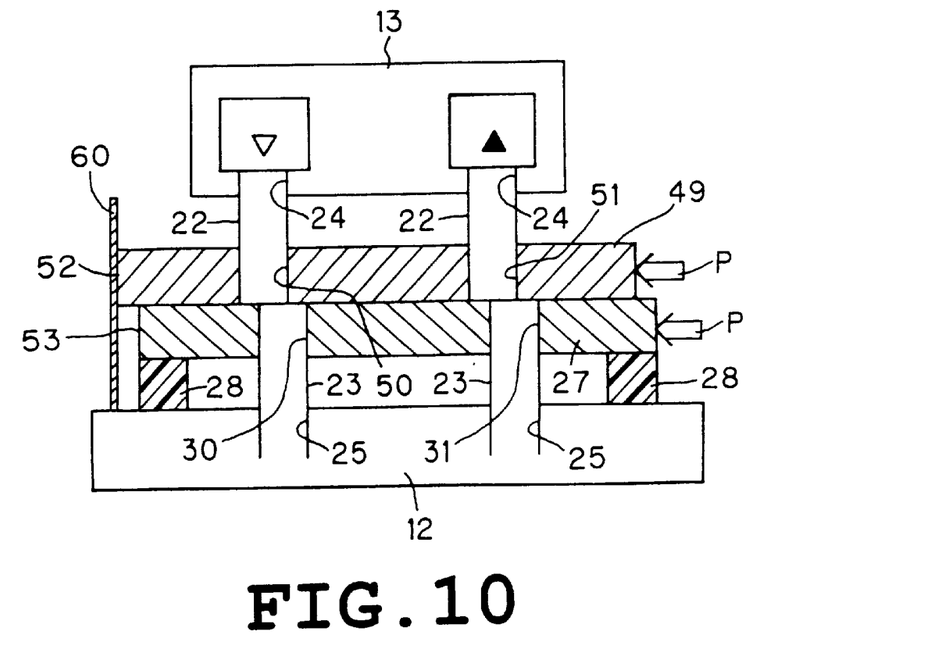
FIG. 10 is a sectional view illustrating the process of mounting the chip on the substrate of the circuit board.
Figure 11:
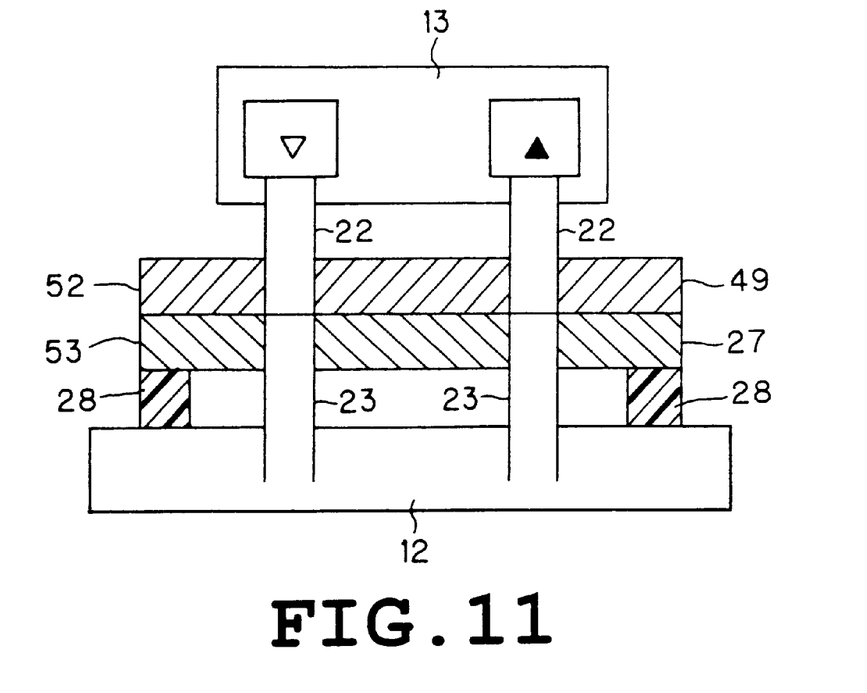
FIG. 11 is a sectional view illustrating the process of mounting the chip on the substrate of the circuit board.

When the chip 13 with the subsidiary guide member 49 is to be mounted on the circuit board substrate 12 on which the guide member 27 is fixed, the chip 13 is positioned and lowered toward the substrate 12 in a vertical direction as shown in FIG. 9. Assume that the tip ends of the first optical fibers 22 take offset positions relative to the tip ends of the second optical fibers 23. The first and second optical fibers 22, 23 cannot be coupled in face-to-face coaxial relation in this condition. If the displacement force P is acted on the guide member 27 and the subsidiary guide member 49 in a lateral direction in parallel with the surface of the substrate 12 until the reference planes 53, 52 on the guide members 27, 49 abut against a common abutment wall 60, the displacement force P may forcibly displace the tip ends of the first optical fibers 22. Otherwise, the displacement force P may forcibly displace the tip ends of the second optical fibers 23 as shown in FIG. 10. The relative displacement between the first and second optical fibers 22, 23 allows, as shown in FIG. 11, the tip ends of the first and second optical fibers 22, 23 to assume face-to-face coaxial positions. The fixation of the guide member 27 and the subsidiary guide member 49, for example by an adhesive, serves to fixedly couple the first and second optical fibers 22, 23 with each other.

Figure 12:
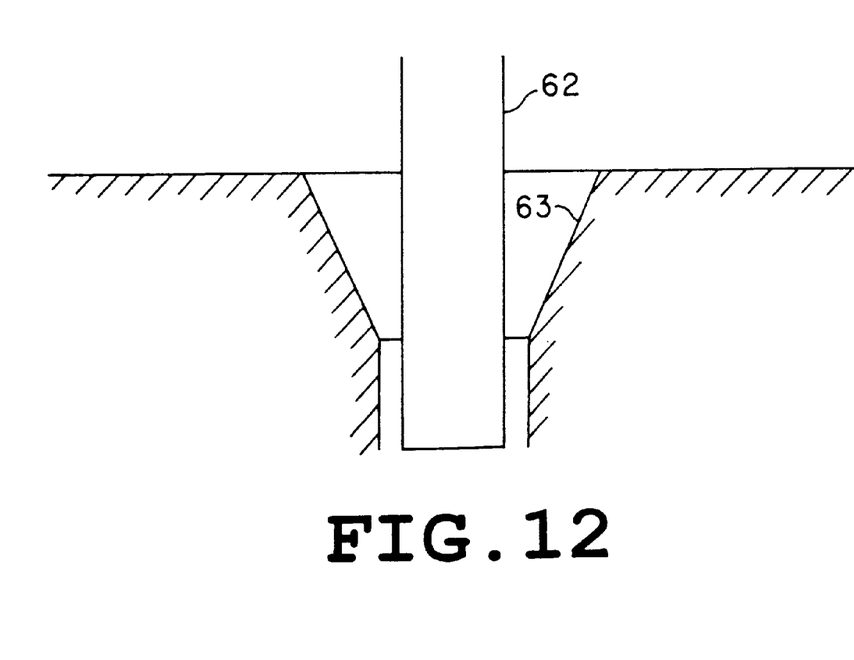
FIG. 12 is a sectional view illustrating a taper.

In implementing the above-described embodiments, a taper 63 may be formed at the entrances of the guide bores 30, 31 and subsidiary guide bores 50, 51 for easier insertion of an optical fiber 62 as shown in FIG. 12. Moreover, an optical transmission mechanism of the present invention may be applied to not only a computer system such as a main frame, but also other instrument required to employ an optical signal transmission. In addition, the present invention may be applied to a multi-chip module in which a plurality of chips are packaged on a small circuit substrate.

What is claimed is:

1. An optical transmission mechanism comprising:
   a first optical fiber protruding from a chip; and
   a second optical fiber protruding from a substrate so as to be coupled to the first optical fiber when the chip is mounted on the substrate.

2. The optical transmission mechanism according to claim 1, wherein said mechanism is applied to a circuit board comprising an optical transmission path formed in the substrate.

3. The optical transmission mechanism according to claim 1, further comprising a guide member contacting a tip end of the second optical fiber.

4. The optical transmission mechanism according to claim 3, wherein said guide member is displaced by a force with respect to the substrate when the chip is mounted on the substrate.

5. The optical transmission mechanism according to claim 4, wherein said mechanism is applied to a circuit board comprising an optical transmission path formed in the substrate.

6. The optical transmission mechanism according to claim 3, further comprising a subsidiary guide member contacting a tip end of the first optical fiber.

7. The optical transmission mechanism according to claim 6, said subsidiary guide member is positioned with respect to the guide member when the chip is mounted on the substrate.

8. The optical transmission mechanism according to claim 7, wherein said guide member and subsidiary guide member are urged against an abutment wall.

9. The optical transmission mechanism according to claim 8, wherein said mechanism is applied to a circuit board comprising an optical transmission path formed in the substrate.

10. A method for mounting a chip, comprising:
    positioning a chip with respect to a substrate of a circuit board; and
    displacing a tip end of an optical fiber protruding from the substrate with respect to a tip end of an optical fiber protruding from the chip by moving a guide member contacting at least one of the tip ends relative to at least one of the chip and substrate.

* * * * *